US007172817B2

(12) United States Patent
Kishimoto et al.

(10) Patent No.: US 7,172,817 B2
(45) Date of Patent: Feb. 6, 2007

(54) INDIUM PARTICLE CONTAINING TIN, METHOD FOR PRODUCING THE SAME AND ELECTROCONDUCTIVE SHEET COMPRISING THE SAME

(75) Inventors: Mikio Kishimoto, Moriya (JP); Nobuko Kasajima, Nagaokakyo (JP); Yuko Sawaki, Kyoto (JP); Noriaki Otani, Minoh (JP)

(73) Assignee: Hitachi Maxell, Ltd., Osaka (JP)

( * ) Notice: Subject to any disclaimer, the term of this patent is extended or adjusted under 35 U.S.C. 154(b) by 27 days.

(21) Appl. No.: 10/495,527

(22) PCT Filed: Nov. 14, 2002

(86) PCT No.: PCT/JP02/11861

§ 371 (c)(1),
(2), (4) Date: May 13, 2004

(87) PCT Pub. No.: WO03/042105

PCT Pub. Date: May 22, 2003

(65) Prior Publication Data
US 2005/0008847 A1    Jan. 13, 2005

(30) Foreign Application Priority Data
Nov. 16, 2001  (JP) .............................. 2001-352092

(51) Int. Cl.
*B32B 5/16*     (2006.01)
(52) U.S. Cl. ...................... 428/545; 528/328; 528/402; 528/570; 528/639; 528/642; 528/913

(58) Field of Classification Search ................ 428/402, 428/570, 545, 639, 642, 328, 913
See application file for complete search history.

(56) References Cited

U.S. PATENT DOCUMENTS 5,417,816 A * 5/1995 Nakashima et al. ........ 205/508

(Continued)

FOREIGN PATENT DOCUMENTS

JP           61-295208 A      12/1986

(Continued)

OTHER PUBLICATIONS

Keita Ura et al., "Preparation and Properties of Uniform Colloidal Indium Compounds of Different Morphologies, Colloids and Surfaces", 1990, vol. 50, pp. 281 to 293.

(Continued)

*Primary Examiner*—H. Thi Le
(74) *Attorney, Agent, or Firm*—Birch, Stewart, Kolasch & Birch, LLP

(57) ABSTRACT

An aqueous solution of a tin salt and an indium salt is added to an aqueous alkaline solution to form a hydroxide or a hydrate comprising tin and indium, the hydroxide or hydrate is heated at a temperature of 110 to 300° C. in the presence of water, filtered and dried, and then the hydroxide or hydrate is heated at a temperature of 200 to 1000° C. to form the tin-containing indium oxide particles. Thereby, tin-containing indium oxide particles which have a plate-form shape and an average particle size in the plane direction of 10 to 200 nm are obtained. The tin-containing indium oxide particles are suitable for forming an electrically conductive transparent coating film.

6 Claims, 4 Drawing Sheets

U.S. PATENT DOCUMENTS

| | | | |
|---|---|---|---|
| 5,504,133 A * | 4/1996 | Murouchi et al. | 524/430 |
| 5,820,843 A * | 10/1998 | Yukinobu et al. | 423/594.9 |
| 5,833,941 A * | 11/1998 | Yukinobu et al. | 423/624 |
| 6,315,848 B1 * | 11/2001 | Kondo | 156/99 |
| 6,471,889 B1 * | 10/2002 | Hayashi et al. | 252/520.1 |
| 6,908,574 B2 * | 6/2005 | Inamura et al. | 252/500 |
| 2004/0140456 A1 * | 7/2004 | Hattori et al. | 252/500 |

FOREIGN PATENT DOCUMENTS

| | | | |
|---|---|---|---|
| JP | 62-7627 A | 1/1987 |
| JP | 62-243205 A | 10/1987 |
| JP | 5-058627 A | 3/1993 |
| JP | 5-201731 A | 8/1993 |
| JP | 6-232586 A | 8/1994 |
| JP | 2001-220137 A | 8/2001 |

OTHER PUBLICATIONS

Luis A. Perez-Maqueda et al., "Nanosize Indium Hydroxide by Peptization of Colloidal Precipitates, Langmuir", 1998, vol. 14, No. 16, pp. 4397 ti 4401.

* cited by examiner

INDIUM PARTICLE CONTAINING TIN, METHOD FOR PRODUCING THE SAME AND ELECTROCONDUCTIVE SHEET COMPRISING THE SAME

FIELD OF THE INVENTION

The present invention relates to tin-containing indium oxide particles, a method for producing the same and an electrically conductive sheet comprising the same. More particularly, the present invention relates to tin-containing indium oxide particles having a novel plate-form particle shape, which are suitably used in the production of a transparent electrically conductive sheet, a method for producing such tin-containing indium oxide particles and an electrically conductive sheet containing such tin-containing indium particles.

BACKGROUND ART

Hitherto, tin oxide particles, antimony-containing tin oxide particles, tin-containing indium oxide particles and the like are known as materials for transparent electrically conductive paints. Among them, tin-containing indium oxide particles comprising indium oxide containing tin is used to coat the surface of a cathode ray tube (CRT) and a liquid crystal display (LCD), which requires antistatic properties and electromagnetic wave shielding properties, since they have good light transmission to visible light and high electrical conductivity. Furthermore, a sheet on the surface of which is coated with such particles is expected to find a wide variety of applications such as a touch panel besides the displays because of its good light transmission and electrical conductivity.

The tin-containing indium oxide particles are transparent to visible light and also semiconductive materials which exhibit electrical conductivity due to oxygen deficiencies. That is, it is envisaged that tin atoms in indium oxide may form $Sn^{4+}$ and act as electron donors and thus the indium oxide particles have high conductivity.

When the tin-containing indium oxide particles are dispersed in a binder and coated on a substrate, their particle size should be usually a half or less of the wavelength of light to achieve high transparency. Therefore, the particle size should be 200 nm or less so that a coating film containing the particles is transparent to visible light.

To produce such tin-containing indium oxide particles, for example, JP-A-62-7627 discloses a method comprising adding an aqueous alkaline solution such as aqueous ammonia or an aqueous ammonium carbonate solution to an aqueous solution of a mixture of indium chloride and tin chloride to coprecipitate hydroxide of indium and tin, heating the hydroxide to form tin-containing indium oxide and then mechanically milling the oxide to obtain fine particles of tin-containing indium oxide. In the Examples of this JP application, tin-containing indium oxide particles having an average particle size of 0.1 µm was produced by heating and subsequent mechanical milling.

JP-A-5-201731 describes that it is important for the achievement of high conductivity to adjust the content of sodium and potassium to a specific amount or less when the mixed hydroxide of indium and tin, which is formed by coprecipitation in the same manner as JP-A-62-7627, is sintered and milled to obtain tin-containing indium oxide particles. JP-A-5-201731 describes that tin-containing indium oxide particles having a particle size of 0.01 to 0.03 µm were obtained after milling.

JP-A-2001-220137 describes that agglomerates are less formed during sintering at a higher heating temperature, when potassium is present when the coprecipitated hydroxide of indium and tin are sintered to form tin-containing indium oxide particles, and further that tin-containing indium oxide particles having a particle size of 0.12 to 0.3 µm are obtained after sintering and milling.

JP-A-6-232586 discloses an electromagnetic wave-shielding film comprising fine conductive particles, which contain indium oxide and tin oxide, and describes that it is essential for the conductive particles to be granular particles having a particle size of 30 to 50,000 Å in order to maintain the transparency of the film and the dispersibility of the particles. Example 1 of this JP patent application produced tin-containing indium oxide fine particles having a cubic particle shape.

In general, the coating film of tin-containing indium oxide particles is formed by applying a paint, which comprises such particles dispersed in a solvent containing an inorganic or organic binder, on various substrates. In such a case, not only the particles are minute or fine particles but also the particles are uniformly dispersed in the film to achieve the transparency of the coating film.

However, when the particles are made minute or fine, they tend to form secondary agglomerates in the paint and thus it is difficult to obtain a uniform dispersion. If such agglomerates are present in dispersion, the coating film has decreased electrical conductivity and also the transparency of the film deteriorates.

An essential problem of the tin-containing indium oxide particles is that the electrical conductivity of the film decreases as the particle size decreases. A reason for this is as follows: The electrical conductivity of the coating type electrically conductive film is achieved by flowing the electricity through contacts between the particles. In the case of granular particles, since the contacts are point contacts, the number of point contacts increases as the particle size decreases, so that the resistance as a whole increases. That is, although the tin-containing indium oxide particles themselves are electrically conductive, the conductivity of a coating film containing the particles largely depends on the contact resistance between the particles.

Therefore, the transparency and the electrical conductivity of the coating film containing the tin-containing indium oxide particles have a trade-off relationship, since the particle size should be made as small as possible to achieve the transparency of the film, but the number of point contacts increases and thus the electrical resistance increases as the particle size decreases.

The coating film comprising the tin-containing indium oxide particles uses particles having a suitable particle size which can attain a good balance between the transparency and electrical conductivity of the film. However, the properties of such a coating film are inferior to the properties of a film of tin-containing indium oxide which is formed by vapor deposition or sputtering. Thus the coating film comprising the tin-containing indium oxide particles may not sufficiently make use of the coating easiness and low cost of the paint, and can be used in very limited applications.

SUMMARY OF THE INVENTION

Objects of the present invention are to provide tin-containing indium oxide particles having hitherto unknown particle shapes as fine particles to be used in a coating type transparent electrically conductive film, and a method for producing such particles, and also to provide an electrically conductive film comprising such tin-containing indium oxide particles.

The inventors have made extensive research to achieve the above objects, and have completed a novel method for producing tin-containing indium oxide particles, which is entirely different from the conventional methods for the production of tin-containing indium oxide particles. As a result, the inventors have developed tin-containing indium oxide particles having a plate-form shape and an average particle size of 10 nm to 200 nm, which cannot be produced by the conventional methods.

That is, according to the first aspect, the present invention provides tin-containing indium oxide particles having an average particle size of 10 nm to 200 nm. According to the second aspect, the present invention provides a method for producing tin-containing indium oxide particles having the above specific particle shape and the specific particle size comprising the steps of adding an aqueous solution containing a tin salt and an indium salt to an aqueous alkaline solution to form a hydroxide or a hydrate comprising tin and indium, heating the hydroxide or hydrate at a temperature of 110 to 300° C. in the presence of water, filtering and drying the hydroxide or hydrate, and then heating the hydroxide or hydrate at a temperature of 200 to 1000° C.

The tin-containing indium oxide particles produced by the method of the present invention have the plate-form particle shape. Therefore, they achieve high transparency when a coating film is formed with such tin-containing indium oxide particles. This is because such particles have an optical anisotropy such that they are easily arranged on a substrate with the plate planes being in parallel with the surface of the substrate when they are coated on the substrate, since they have the plate-form particle shapes, and as a result, incident light from the upward direction of the plate planes, that is, light coming from a direction perpendicular to the surface of the substrate, easily passes through the plates.

In addition, when the particle planes are arranged in parallel with the surface of a substrate, the contacted area between the particles increases. That is, the tin-containing indium oxide particles of the present invention have the plate-form shape and thus they contact with each other on their planes so that the contact areas greatly increases, while the conventional tin-containing indium oxide particles have spherical or granular shapes and thus they contact with each other at points. Accordingly, in a coating film comprising the tin-containing indium oxide particles of the present invention, a contact resistance is smaller than that in a coating film comprising the conventional tin-containing indium oxide particles. As a result, the former achieves the higher electrical conductivity than the latter.

As explained above, the plate-form tin-containing indium oxide particles of the present invention can achieve both the transparency and electrical conductivity of the coating film, which have the trade-off relationship and they are breakthrough conductive particles which solve the problem which has not been solved for a long time.

Furthermore, the present inventors have found that when plate-form tin-containing indium oxide particles of the present invention contains aluminum by a specific means, the electrical conductivity of the particles is significantly increased.

The indium oxide particles containing tin and also aluminum can be produced by adding an aqueous solution containing a tin salt and an indium salt to an aqueous alkaline solution to form the hydroxide or hydrate comprising tin and indium, adding an aluminum compound to the hydroxide or hydrate comprising tin and indium, heating the mixture of the hydroxide or hydrate and the aluminum compound at a temperature of 110 to 300° C. in the presence of water, filtering and drying the product, and then heating the dried product at a temperature of 200 to 1000° C.

Accordingly, the present invention achieves the specific plate-form of the tin-containing indium oxide particles, which cannot be achieved by the conventional particles, and an average particle size of 10 nm and 200 nm, and also realizes a high electrical conductivity by the addition of aluminum and tin to the indium oxide particles.

In a sheet comprising the plate-form tin-containing indium oxide particles of the present invention, the particles can be easily laminated on each other and therefore the contact areas increase and in turn the contact resistance decreases, in contrast to the conventional tin-containing indium oxide particles having irregular spherical or granular shapes. Since the particle shapes are plate-form, if the particles are laminated to form secondary particles, the particles are easily arranged on a substrate with the particle planes being in parallel with the surface of the substrate and thus they allow incident light in a direction perpendicular to the substrate surface to pass through the particles. Furthermore, a large amount of the laminated plate-form particles can easily be filled in the coating film in a higher amount in comparison with the spherical or granular particles.

Accordingly, the transparent electrically conductive sheet according to the present invention increases the electrical conductivity by:

1. the use of tin-containing indium oxide particles having a plate-form shape and an average particle size of 10 to 200 nm;

2. the decrease of the contact resistance between the particles through the increase of the contact areas between the particles in the coating film;

3. the increase of the transmission of incident light from a direction perpendicular to a substrate surface by arranging the particles with the particles planes being in parallel with the surface of the substrate by making use of the property of the plate-form particles such that they are easily arranged in parallel with the surface of the substrate; and 4. the increase of the amount of the particles contained in the coating film by making use of the property of the plate-form particles such that they are easily laminated.

Besides the good transparency and good electrical conductivity of the plate-form particles, the electrical conductivity of the indium oxide particles is increased by:

5. the addition of aluminum and tin to the plate-form indium oxide particles, whereby the electrical conductivity of the particles having the good transparency and the conductivity is further increased.

The characteristic properties of the plate-form particles according to the present invention are distinctly exhibited when a coating film having a thickness of 3 to 10 μm and containing 83 to 95% by weight of the tin-containing indium oxide particles having an average particle size of 10 to 200 nm in its plate plane direction is formed on a substrate. Accordingly, the coating film having a surface resistance of 1000 Ω/sq. or less while maintaining a total light transmittance of at least 90%, which is believed to be substantially impossible to achieve with coating films, can be realized.

BEST EMBODIMENTS FOR CARRYING OUT THE INVENTION

Figure 1:
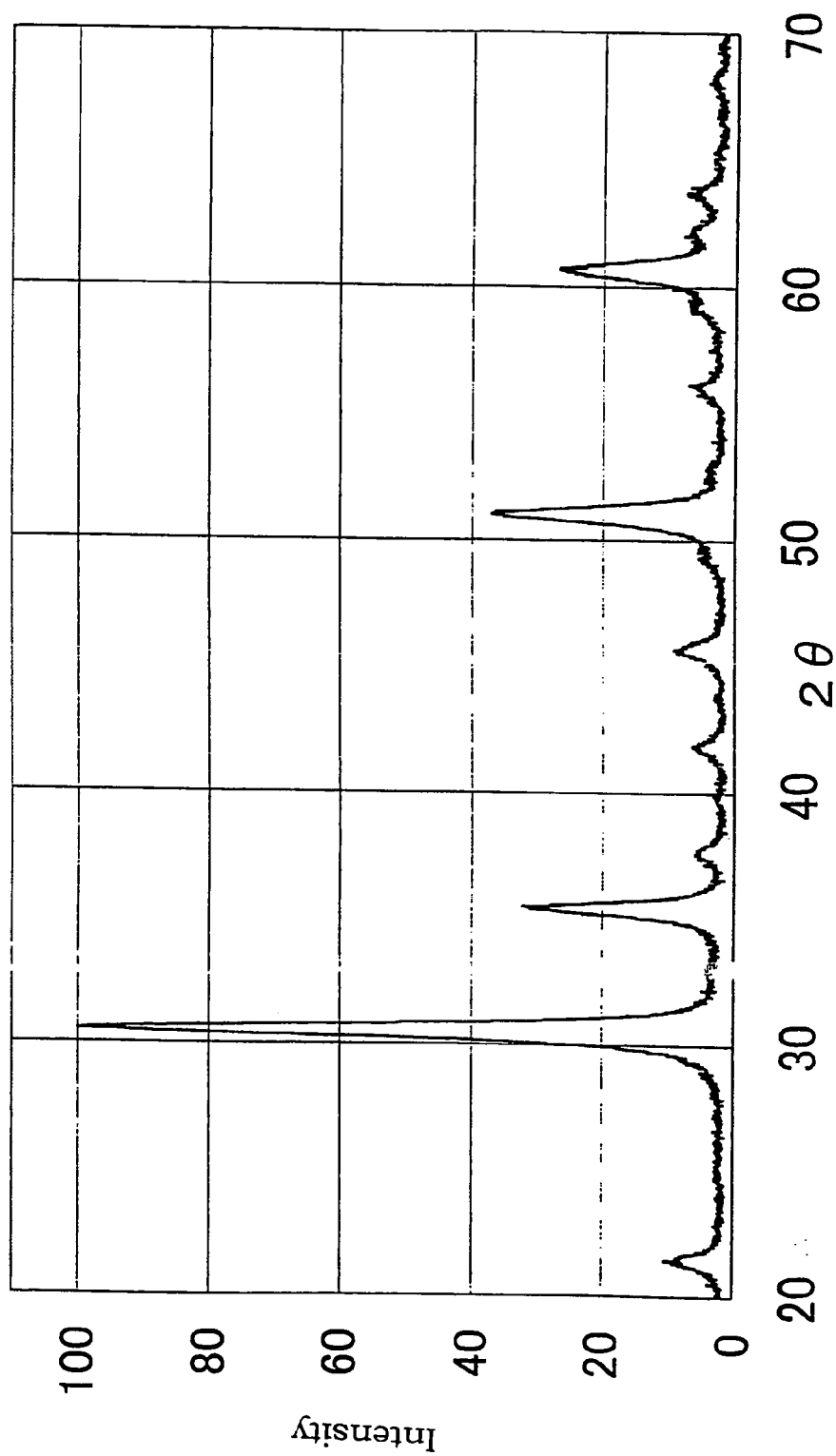
FIG. 1 is an X-ray diffraction spectrum of the plate-form tin-containing indium oxide particles obtained in Example 1.

According to the method of the present invention, in the first step, an aqueous solution of an indium salt is added to an aqueous alkaline solution containing a tin salt dissolved therein to form a hydroxide or a hydrate comprising tin and indium. The formed hydroxide or hydrate is aged in a suspension state at a temperature of 10 to 50° C. This aging step is important since the particle shape is substantially defined in this aging step and a subsequent hydrothermal treating step. A pH value during aging is preferably in a neutral to weakly alkaline range, for example, from 7 to 12, and an aging time is preferably from 10 to 100 hours.

Next, an aqueous alkaline solution is added to the suspension after aging to adjust the pH of the suspension in a weakly alkaline range. Thereafter, the suspension is subjected to a hydrothermal treatment at a temperature in a range of 110 to 300° C. When the hydrothermal treatment is finished, the particle shape is substantially defined. When the hydrothermal treating temperature is lower than 110° C., this treatment has minor effects on the particles. When the hydrothermal treating temperature is higher than 300° C., the particles are excessively crystallized so that the particle size tends to be too large. The hydrothermal treating temperature is optimally from 110 to 300° C. to obtain the tin-containing indium oxide particles of the present invention, which achieve both the good transparency and good conductivity when they are processed in the form of a coating film.

In the above step for forming the hydroxide or hydride comprising tin and indium, when 0.5 to 15% by mole of an aluminum compound is optionally added to the hydroxide or hydride comprising tin and indium, a part of tin and/or indium atoms are replaced with the aluminum atoms so that the electrical conductivity of the particles is further increased.

In the second step of the method of the present invention, the particles are washed with water, filtrated, dried and then heated in an air at a temperature of 200 to 1000° C. In this heating treatment, the particles are dehydrated, and at the same time, the crystal of the particles is changed from the hydroxide or hydrate to the oxide. Thereby, the indium oxide a part of indium atoms of which are substituted with tin atoms is obtained. When the heating temperature in this step is lower than 200° C., the dehydration, oxidation and substitution may proceed insufficiently so that the particles may not have sufficient conductivity. When the heating temperature is higher than 1000° C., the particles tend to be unpreferably agglomerated together so that the dispersibility of the particles may deteriorate when the particles are formulated as a paint.

Although the tin-containing indium oxide particles which have been heat-treated in the second step have conductivity, their conductivity can be further increased, when the tin-containing indium oxide particles are reduced at a temperature of 200 to 500° C. The increase of the conductivity may be achieved because the number of oxygen deficiencies is increased by the reduction so that the conductivity is exhibited by such vacancies formed by the oxygen deficiencies, besides the electron conduction by the substitution of $In^{3+}$ with $Sn^{4+}$.

The present invention successfully developed the tin-containing indium oxide particles having a plate-form shape and an average particle size of 10 to 200 nm, which cannot be produced by the conventional methods, based on the innovative idea that the step for adjusting the shape and size of the particles and the step for deriving the inherent properties of the material to the maximum are separately carried out.

Hereinafter, the production method of the present invention will be explained in detail.

Preparation of Precipitates

An aqueous solution of an indium salt such as indium nitrate, indium sulfate, etc. is prepared. Separately, an aqueous alkaline solution is prepared. As an alkali, sodium hydroxide, potassium hydroxide, lithium hydroxide, or aqueous ammonia is preferably used. In the aqueous alkaline solution, a tin salt such as tin chloride, tin nitrate, tin sulfate, etc. is dissolved. Among the tin salts and the indium salts, chlorides are most preferable to produce the plate-form tin-containing indium oxide particles.

Next, the aqueous solution of an indium salt is dropwise added to the aqueous alkaline solution containing the tin salt dissolved to precipitate the hydroxide or hydrate comprising tin and indium. The suspension containing the precipitated hydroxide or hydrate preferably has a pH of 7 to 12, more preferably a pH of 7.5 to 10 in a weakly alkaline range.

The suspension is aged at a temperature of 10 to 50° C. for 10 to 100 hours. When the aging temperature is lower than 10° C., the particles may not sufficiently be aged. When the aging temperature is too high, particles having shapes other than plates tend to be formed. When the aging time is shorter than 10 hours, the particles may not sufficiently be aged. The aging time longer than 100 hours may be meaningless, since the aging effects may be saturated. The aging temperature and the aging time are mutually related. Usually, as the aging temperature is lower, the aging time is longer. This aging step and the following hydrothermal treatment are both important steps for defining the shapes of the tin-containing indium oxide particles, which are the intended final product.

The particle shape of the tin-containing indium hydroxide, which is the precursor of tin-containing indium oxide particles, is substantially defined by the aging step and the hydrothermal step. In general, when the aging temperature is low, the particle size of the precursor tin-containing indium hydroxide particles is small, and when the aging temperature is high, the particle size of the hydroxide particles is large.

To prepare the indium oxide particles containing aluminum and tin, an aluminum compound in an amount of 0.5 to 15% by mole in terms of aluminum is added to the above suspension containing the precipitate, and then the pH of the suspension is adjusted in a range of 7 to 12.

In the subsequent steps, the indium oxide particles containing tin and those containing tin and aluminum can be treated in the same manner. Therefore, the subsequent steps will be explained with regard to the tin-containing oxide particles only.

Hydrothermal Treatment

The hydroxide or hydrate containing indium and tin, which is obtained in the previous aging step, is hydrothermally treated. Since the pH of the suspension may be slightly changed by aging, an aqueous alkaline solution is added to the suspension after aging to readjust pH in a range of 8 to 12, preferably 9 to 11. Then, the hydrothermal treatment is carried out using, for example, an autoclave. In the hydrothermal treatment, the suspension containing the precipitate as such can be treated after its pH is adjusted with the aqueous solution of sodium hydroxide, etc. Preferably, products other than the precipitated hydroxide or hydrate, any residual materials and the like are removed by washing with water, and then the pH of the suspension is readjusted with sodium hydroxide, etc. In this case, the pH value is preferably in the weakly alkaline range. Outside the weakly alkaline range, the crystal may not sufficiently grow so that particles having irregular shapes or granular particles tend to be formed.

A temperature in the hydrothermal treatment is preferably from 110 to 300° C. When this temperature is lower than 110° C., the hydroxide or hydrate comprising tin and indium having a plate form may not be obtained. When this temperature is higher than 300° C., the pressure generated becomes too high so that an apparatus used for the hydrothermal treatment becomes expensive.

The hydrothermal treatment time is preferably from 1 to 4 hours. When the hydrothermal treatment time is too short, the particles having the plate form may not sufficiently grow. The longer hydrothermal treatment time may not cause any problem, but increases the production cost.

After the hydrothermal treatment, the hydroxide or hydrate comprising tin and indium is filtrated, dried and then heated. Before filtration, the pH of the suspension containing the hydroxide or hydrate is preferably adjusted in a neutral range around 6 to 9 by washing with water to remove sodium ions. If the sodium ions remain after heating, the particles may have a high electrical resistance. Therefore, the sodium ions are preferably removed as much as possible.

The hydroxide or hydrate comprising tin and indium may be treated with silica by adding to a silicon compound such as sodium silicate to the hydroxide or hydrate particles. The treatment with silica is effective to maintain the plate shape of the tin-containing indium oxide particles. The amount of the silica is preferably from 0.1 to 5% by weight based on the weight of the tin-containing indium oxide particles. When the amount of the silica is less than 0.1% by weight, the effect for maintaining the particle shape is low. When the amount of the silica exceeds 5% by weight, the coateda mount of the silica which is an electrically insulation material increases so that the electrical conductivity of the tin-containing indium oxide particles decreases.

Heating Treatment

The hydroxide or hydrate comprising tin and indium, which is obtained by the above hydrothermal treatment, is heated to form tin-containing indium oxide particles in which a part of the indium atoms are substituted with the tin atoms.

An atmosphere in the heating treatment may not be limited. The heating in an air is preferable since the production costs can be minimized. The heating temperature is preferably from 200 to 1000° C., more preferably from 300 to 800° C. In this temperature range, the plate shape of the particles, which is one of the characteristics of the present invention, can be maintained.

When the heating temperature is lower than 200° C., the crystal structure in which the indium atoms are partly substituted with the tin atoms may not be formed, and a mixture of the tin oxide and the indium oxide may be formed so that the sufficiently high electrical conductivity may not be achieved. When the heating temperature exceeds 1000° C., the plate-form particles tend to be sintered together so that they are not sufficiently dispersed in the paint. As a result, the transparency of the coating film decreases.

By such a heating treatment, the tin-containing indium oxide particles are obtained. After the heating treatment, the particles are preferably washed with water to remove the unreacted compounds or other residual materials. Thereby, the tin-containing indium oxide particles having the improved electrical conductivity can be obtained.

Reduction Treatment

The tin-containing indium oxide particles as obtained in the above step has the conductivity. To further increase the conductivity, the particles are preferably reduced in a reducing atmosphere. A reduction temperature is preferably from 200 to 500° C. When the reduction temperature is hither than 500° C., the indium oxide particles are excessively reduced so that metal indium tends to segregate and the particles are sintered together. When the reduction temperature is lower than 200° C., the conductivity of the particles may not be significantly increased. The kind of the reducing atmosphere is not limited. Usually, hydrogen gas, carbon monoxide gas, vacuum atmosphere, etc. are used. Among them, the hydrogen gas is used as the most easily available reducing gas.

The thus produced tin-containing indium oxide particles have the plate-form shape and an average particle size in the plane direction of 10 to 200 nm, and exhibit good transparency and electrical conductivity in the coating film.

Preparation of Paint

The tin-containing indium oxide particles are added to and dispersed in a binder solution.

A binder in which the tin-containing indium oxide particles are dispersed is not limited. Examples of the binder include vinyl chloride resins, vinyl chloride-vinyl acetate copolymer resins, vinyl chloride-vinyl alcohol copolymer resins, vinyl chloride-vinyl acetate-maleic anhydride copolymer resins, vinyl chloride-hydroxyl group-containing alkyl acrylate copolymer resins, nitrocellulose, polyester resins, polyurethane resins, etc. They may be used singly or in admixture of two or more of them. In particular, the vinyl chloride resin and the polyurethane resin are preferably used since the tin-containing indium oxide particles can be well dispersed in these resins. Examples of the polyurethane resins include polyester polyurethane, polyether polyurethane, polyether polyester polyurethane, polycarbonate polyurethane, polyester polycarbonate polyurethane, etc.

A dispersant can be added to the binder to improve the dispersibility of the tin-containing indium oxide particles. Any conventional dispersant may be used.

Examples of an organic solvent which is used to prepare a dispersion-type paint of the tin-containing indium oxide particles include aromatic solvents (e.g. benzene, toluene, xylene, etc.), ketone solvents (e.g. acetone, cyclohexanone, methyl ethyl ketone, methyl isobutyl ketone, etc.), acetate solvents (e.g. ethyl acetate, butyl acetate, etc.), carbonate solvents (e.g. dimethyl carbonate diethyl carbonate, etc.), alcohol solvents (e.g. ethanol; isopropanol, etc.), hexane, tetrehydrofuran, dimethylsulfoxide, and so on. A dispersing method is not limited. For example, various dispersion means such as ball mills, sandmills, paint conditioners, etc. can be used.

The plate-form tin-containing indium oxide particles of the present invention exhibit the excellent transparency and electrical conductivity, which cannot be achieved by the conventional spherical or granular tin-containing indium oxide particles, when they are used in the coating film, because of their special particle shape. When the tin-containing indium oxide particles of the present invention is added to and dispersed in a binder solution so that the content of the particles in the coating film is from 83 to 95% by weight, the characteristic properties of the tin-containing indium oxide particles of the present invention can be outstandingly attained. That is, the coating film comprising the tin-containing indium oxide particles of the present invention can realize the transparency and electrical conductivity at extremely high levels which are thought to be impossible to achieve with the conventional coating films. Herein, the "content" means a weight proportion of the tin-containing indium oxide particles of the present invention based on the total solid weight of the tin-containing indium oxide particles, the binders and other various additives. Of course, even when the content is less than 83% by weight, the plate-form tin-containing indium oxide particles of the present invention can achieve the sufficiently high transparency and electrical conductivity in comparison with the conventional granular tin-containing indium oxide particles. When the content of the plate-form tin-containing indium oxide particles of the present invention is 83% by weight or larger, the transparency and electrical conductivity of the coating film outperform those of the coating film containing the conventional spherical or granular tin-containing indium oxide particles. When the content of the tin-containing indium oxide particles of the present invention exceeds 95% by weight, the electrical conductivity of the coating film further increases, while the transparency may not be superior to the coating films containing the conventional spherical or granular tin-containing indium oxide particles.

Preparation of Coating Film

A coating paint comprising the tin-containing indium oxide particles, which has been prepared by the above method, is applied on a substrate. An application method is not limited, and the paint can be applied with a die coater, a bar coater, an applicator, etc. or by screen coating, gravure coating, etc.

The kind of the transparent substrate for forming the transparent conductive coating film thereon is not limited, and may be any conventionally used substrate. Specific examples of the substrate include a film or a sheet having a thickness of 3 to 300 μm and made of, for example, polyesters (e.g. polyethylene terephthalate, polyethylene naphthalate, etc.), polyolefins, cellulose triacetate, polycarbonate, polyamide, polyimide, polyamideimide, polysulfone, aramid, aromatic polyamide, and so on. The substrate may not necessarily be flexible, and a hard substrate such as a glass plate can be used.

The thickness of the coating film is not limited, and may be determined by taking the required transparency and electrical conductivity into account.

When the plate-form tin-containing indium oxide particles of the present invention are used, the coating film has the far superior transparency and electrical conductivity to the coating films containing the conventional spherical or granular tin-containing indium oxide particles. When the coating film has a thickness of 3 to 10 μm, the tin-containing indium oxide particles of the present invention can outstandingly exhibit their effects, and provides the coating film having the properties outperforming those of the coating films containing the conventional spherical or granular tin-containing indium oxide particles.

EXAMPLES

The present invention will be illustrated by the following examples.

Example 1

Sodium hydroxide (0.385 mole) was dissolved in water (800 ml) to prepare an aqueous alkaline solution. In this aqueous alkaline solution, tin(II) chloridepentahydrate (0.013 mole) was further dissolved.

Separately, indium(III) chloride-tetrahydrate (0.119 mole) was dissolved in water (400 ml) to prepare an aqueous solution of indium chloride.

To the aqueous alkaline solution containing tin chloride dissolved; the aqueous solution of indium chloride was dropwise added to form the precipitated hydroxide or hydrate comprising tin and indium. The pH of the aqueous system was 7.9. The precipitate in the suspension form was aged at 20° C. for 48 hours, and then washed with water until the pH of the suspension became 7.6.

Then, an aqueous solution of sodium hydroxide was added to the suspension of the precipitate to adjust the pH at 10.0, and the suspension was charged in an autoclave and hydrothermally treated, at 180° C. for 4 hours. The hydrothermally treated product was washed with water until the pH became 7.6, and then filtrated and dried in an air at 90° C. Thereafter, the product was slightly ground using a mortar to obtain precursor tin-containing indium hydroxide particles.

The obtained precursor tin-containing indium hydroxide particles were heated in an air at 300° C. for 2 hours to obtain tin-containing indium oxide particles, and then reduced in an hydrogen stream at 250° C. for 1 hour.

After reduction, the particle shape of the tin-containing indium oxide particles was observed with a transmission electron microscope. The particles were found to be spherical to square plate-form particles having an average particle size of 30 nm.

Figure 2:
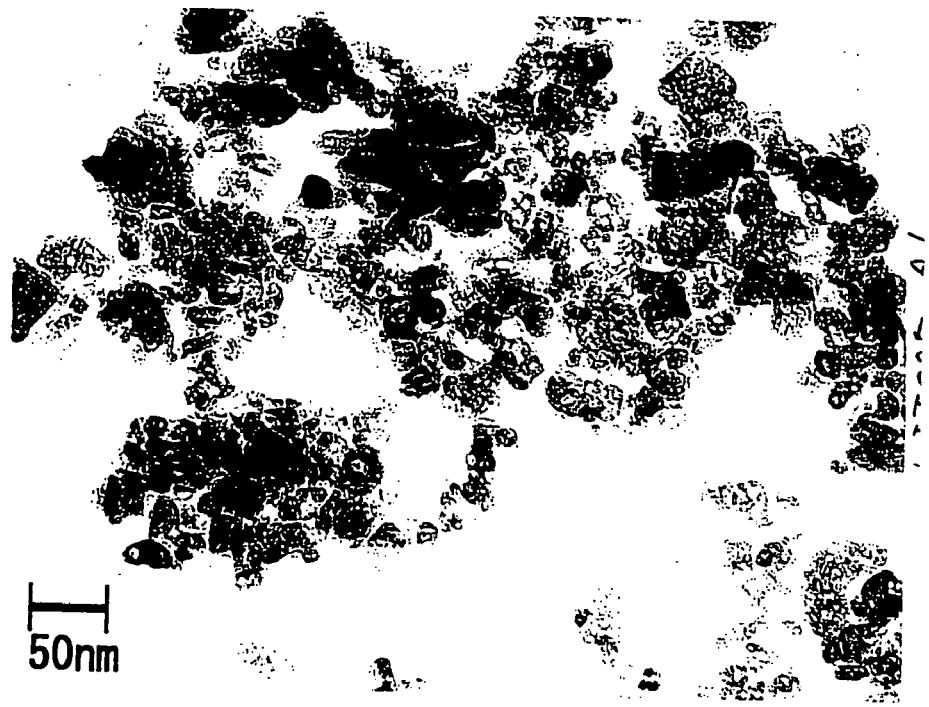
FIG. 2 is a transmission electron microscopic photograph of the plate-form tin-containing indium oxide particles obtained in Example 1 (magnification: 200,000 times).

FIG. 1 shows the X-ray diffraction spectrum of the tin-containing indium oxide particles obtained in this Example, and FIG. 2 shows the transmission electron microscopic photograph (magnification: 200,000 times) of the tin-containing indium oxide particles obtained in this Example.

The X-ray diffraction spectrum of FIG. 1 has the single diffraction pattern substantially corresponding to that of indium oxide although the lattice constant was slightly changed because a part of the indium atoms were substituted with tin atoms. This result confirms that the obtained particles consisted of a single material of indium oxide in which a part of the indium atoms were substituted with the tin atoms.

Example 2

A hydroxide or hydrate comprising tin and indium was prepared in the same manner as in Example 1 except that the precipitate of the hydroxide or hydrate comprising tin and indium was aged at 40° C. for 24 hours, and the pH of the suspension after washing with water and before charging in the autoclave was changed from 10.0 to 10.5. Then, the hydroxide or hydrate comprising tin or indium was hydrothermally treated, washed with water and dried to obtain tin-containing indium oxide particles. Further, the tin-containing indium oxide particles were heated and reduced in the same manner as in Example 1 to obtain tin-containing indium oxide particles.

The X-ray diffraction spectrum of the tin-containing indium oxide particles obtained in this Example was measured, and it was found that the X-ray diffraction pattern was the same as the pattern specific to indium oxide like Example 1. Furthermore, the particles were observed with a transmission electron microscope. The particles were found to be spherical to square plate-form particles having an average particle size of 55 nm.

Figure 3:
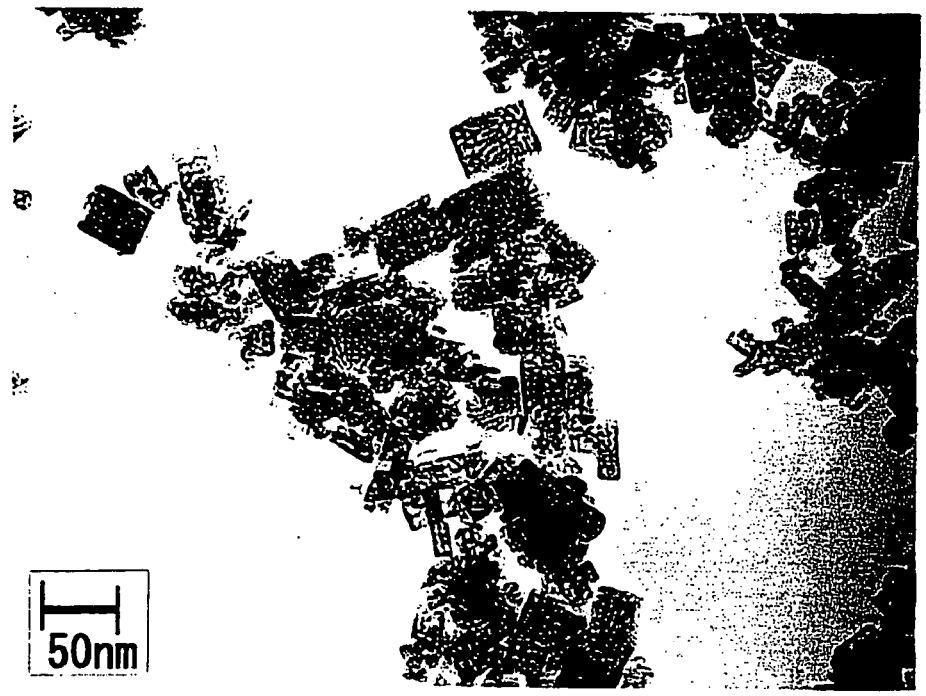
FIG. 3 is a transmission electron microscopic photograph of the plate-form tin-containing indium oxide particles obtained in Example 2 (magnification: 200,000 times).

FIG. 3 shows the transmission electron microscopic photograph (magnification: 200,000 times) of the tin-containing indium oxide particles obtained in this Example.

Example 3

A precipitate of the hydroxide or hydrate comprising tin and indium was prepared in the same manner as in Example 1. To this precipitate, aluminum hydroxide as an aluminum compound was added in an amount such that the content of aluminum in the final product was 5% by mole, and the precipitate in the suspension form was aged at 20° C. for about 20 hours.

Then, to the suspension of the precipitate, the aqueous solution of sodium hydroxide was added to readjust the pH to 10.0, and the suspension was charged in the autoclave and hydrothermally treated at 200° C. for 2 hours.

The hydrothermally treated product was washed with water until the pH became 7.8, and then dried in an air at 90° C. Then, the product was lightly ground using a mortar, and the ground product was heated in an air at 600° C. for 1 hour and then reduced in a hydrogen atmosphere at 250° C. to obtain indium oxide particles containing aluminum and tin. The particles were further washed with water using an ultrasonic disperser to remove the unreacted compounds or residual materials, and filtrated and dried.

The particle shape of the indium oxide particles containing aluminum and tin was observed with a transmission electron microscope. The particles were found to be spherical to square plate-form particles having an average particle size of 50 nm.

Figure 4:
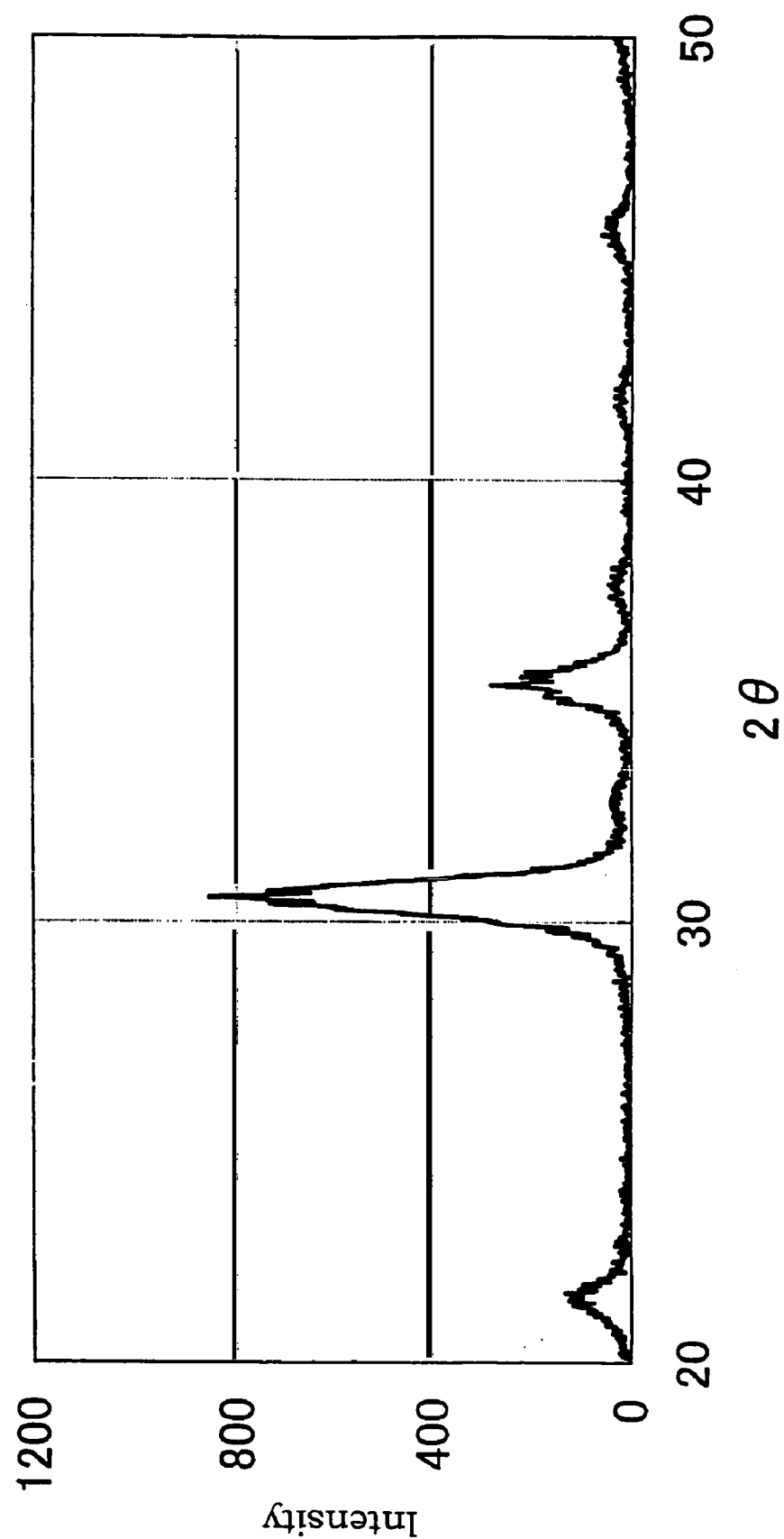
FIG. 4 is an X-ray diffraction spectrum of the indium oxide particles containing aluminum and tin obtained in Example 3.
Figure 5:
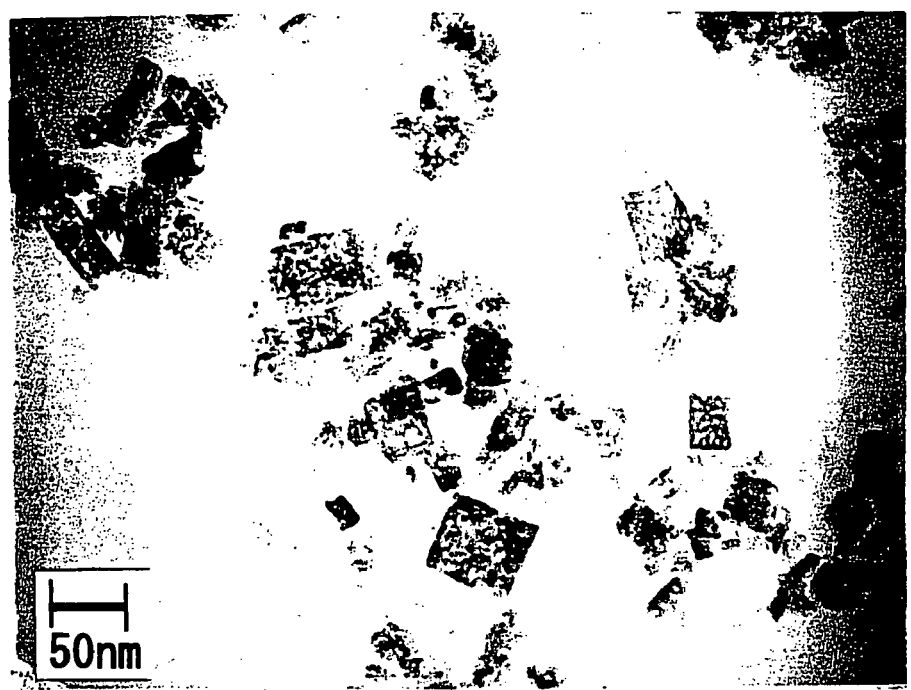
FIG. 5 is a transmission electron microscopic photograph of the indium oxide particles containing aluminum and tin obtained in Example 3 (magnification: 200,000 times).

FIG. 4 shows the X-ray diffraction spectrum of the indium oxide particles containing aluminum and tin obtained in this Example, and FIG. 5 shows the transmission electron microscopic photograph (magnification: 200,000 times) of the indium oxide particles containing aluminum and tin obtained in this Example.

The X-ray, diffraction spectrum of FIG. 4 confirms that the obtained particles consisted of a single material of indium oxide in which a part of the indium atoms were substituted with the aluminum and tin atoms.

Example 4

Indium oxide particles containing aluminum and tin, the particle surfaces of which were treated with silica, were produced in the same manner as in Example 3 except that a solution of sodium silicate was added to the suspension after the hydrothermal treatment in an amount of 1% by weight in terms of sodium silicate based on the weight of the hydroxide or hydrate comprising tin, indium and aluminum, and the pH of the suspension was adjusted to 7.4 by adding hydrochloric acid while stirring.

The X-ray diffraction spectrum of the indium oxide particles containing aluminum and tin obtained in this Example was measured, and it was found that the particles consisted of indium oxide in which a part of indium atoms were substituted with aluminum and tin atoms like Example 3. Furthermore, the particles were observed with a transmission electron microscope. The particles were found to be square plate-form particles having an average particle size of 55 nm.

Example 5

Indium oxide particles containing aluminum and tin were produced in the same manner as in Example 3 except that the amount of aluminum hydroxide to be added was changed to 8% by mole in terms of aluminum.

The X-ray diffraction spectrum of the indium oxide particles containing aluminum and tin obtained in this Example was measured, and it was found that the particles consisted of indium oxide in which a part of indium atoms were substituted with aluminum and tin atoms like Example 3. Furthermore, the particles were observed with a transmission electron microscope. The particles were found to be disc-shape or square plate-form particles having an average particle size of 50 nm.

Comparative Example 1

A precipitate of hydroxide or hydrate comprising tin and indium were prepared in the same manner as in Example 1 except that the precipitate formed was washed with water, filtrated and dried without aging or hydrothermally treating the precipitate. Then, the precipitate was heated and reduced in the same manner as in Example 1 to obtain tin-containing indium oxide particles.

From the X-ray diffraction spectrum of the tin-containing indium oxide particles of this Comparative Example, it was found that the X-ray diffraction pattern was the same as the pattern specific to indium oxide like Example 1. However, according to the observation of the particles with the transmission electron microscope, the particle size had a wide distribution from 50 nm to 200 nm, and the particle shapes were granular or irregular and did not have specific shapes.

Comparative Example 2

A precipitate of hydroxide or hydrate comprising tin and indium were prepared in the same manner as in Example 3 except that the precipitate formed was filtrated and dried without hydrothermally treating the precipitate after the addition of the aluminum compound and aging. Then, the precipitate was dried and heated in the same manner as in Example 3 to obtain indium oxide particles containing aluminum and tin.

From the X-ray diffraction spectrum of the indium oxide particles containing aluminum and tin of this Comparative Example, it was found that the particles had a single phase, and that a part of indium atoms of indium oxide were substituted with aluminum and tin atoms. However, according to the observation of the particles with the transmission electron microscope, the particles were granular or irregular particles having a particle size of 100 nm to 200 nm, and they were sintered together by heating.

Comparative Example 3

In this Comparative Example, the conductivity of the plate form tin-containing indium oxide particles and the plate-form indium oxide particles containing aluminum and tin according to the present invention was compared with that of the commercially available tin-containing indium oxide particles.

When the commercially available tin-containing indium oxide particles were observed with a transmission electron microscope, they were granular particles close to spheres and had an average particle size of about 30 nm.

Example 6

A volume resistivity was measured with the plate-form tin-containing indium oxide particles produced in Examples 1 and 2, the indium oxide particles containing aluminum and tin produced in Examples 3–5, and the granular or irregular tin-containing indium oxide particles optionally containing aluminum produced in Comparative Examples 1 and 2, and the commercially available tin-containing indium oxide particles of Comparative Example 3.

The volume resistivity of the particles was measured by the four-probe method using a LORESTA PA SYSTEM (MCP-PD 41) (manufactured by MITSUBISHI CHEMICAL Co., Ltd.). The measuring conditions included a powder density of 2.7 g/cm$^3$, a vessel diameter of 2 cm, and a probe distance of 3 mm. The results of the volume resistivity measurement are summarized in Table 1.

TABLE 1

| | Particle shape | Al-substitution amount (mol %) | Particle size (nm) | Volume resistivity (Ω/sq.) |
|---|---|---|---|---|
| Ex. 1 | Plate | 0 | 30 | 6.4 |
| Ex. 2 | Plate | 0 | 55 | 3.9 |
| Ex. 3 | Plate | 5 | 50 | $8.8 \times 10^{-2}$ |
| Ex. 4 | Plate | 5 | 55 | $9.1 \times 10^{-2}$ |
| Ex. 5 | Plate | 8 | 50 | $1.6 \times 10^{-1}$ |
| C. Ex. 1 | Irregular | 0 | 50–200 | 610 |
| C. Ex. 2 | Irregular | 5 | 100–200 | 550 |
| C. Ex. 3 | Spherical to granular | 0 | 30 | 9.1 |

In Table 1, the smaller volume resistivity means that the particles have better electrical conductivity. As can be seen from the results of Table 1, the plate-form indium oxide particles containing tin and optionally aluminum produced in the Examples had the better electrical conductivity than the irregular tin-containing indium oxide particles produced in Comparative Examples 1 and 2. This maybe because the particles of Comparative Examples had not only the large particle sizes but also the broad particle size distribution, and therefore the particles could not be uniformly contacted with each other so that the contact resistance between the particles increased and in turn the particles had the large volume resistivity.

On the other hand, the commercially available tin-containing indium oxide particles having the relatively narrow particle size distribution and the small particle size had the conductivity comparable with those of the plate-form tin-containing indium oxide particles of Examples 1 and 2. However, the volume resistivities of the indium oxide particles containing aluminum and tin were smaller by one or two figures than that of the commercially available tin-containing indium oxide particles of Comparative Example 3. That is, the former indium oxide particles had much better conductivity. These results show that the substitution of the indium atoms in the tin-containing indium oxide particles with the aluminum atoms considerably increased the conductivity of the particles.

As already described, the effects of the plate-form shape of the indium oxide particles appear eminently when the particles are used in the coating film. Therefore, the effects of the tin-containing indium oxide particles are examined by measuring the properties of electrically conductive transparent films.

Example 7

Using the plate-form tin-containing indium oxide particles produced in Examples 1 and 2, the irregular tin-containing indium oxide particles produced in Comparative Example 1 and the commercially available tin-containing indium oxide particles of Comparative Example 3, the following components of coating liquids were stirred and mixed and then dispersed with a planetary ball mill (manufactured by Friche) for4 hours to obtain coating liquids.

Each of the coating liquids was coated on a polyethylene terephthalate (PET) film having a thickness of 50 μm with an applicator at a dry thickness of 2 μm.

| | Parts by weight |
|---|---|
| Tin-containing indium oxide particles | 80 |
| Vinyl chloride-vinyl acetate copolymer (MR-110 manufacture by Zeon Corporation) | 15 |
| Polyurethane resin (Vylon UR 8300 manufactured by Toyobo Co., Ltd.) | 5 |
| Methyl ethyl ketone | 75 |
| Toluene | 75 |
| Cyclohexanone | 60 |

With the formed coating films, the total light transmittance and electrical conductivity were evaluated. The total light transmittance was evaluated by measuring a ratio of the intensity of transmitted light to the intensity of incident light (apparatus: UV-visible light spetrophotometer manufacture by NIPPON BUNKO Co., Ltd.), and the electrical conductivity was evaluated by measuring a resistivity by a four probe method (apparatus: LORESTA GP; a resistivity meter manufactured by MITSUBISHI CHEMICAL Co., Ltd.)

The results are summarized in Table 2.

The coating films listed in Table 2 were produced under the same conditions except that the kind of the tin-containing indium oxide particles were different. Thus, to exclusively compare the influence of the particles on the transparency and electrical conductivity, the total light transmittances and the surface resistivities are expressed by relative values with those of the conductive film produced using the spherical to granular tin-containing indium oxide particles of Comparative Example 3 being 100%. The larger total light transmittance means the better transparency, and the smaller surface resistivity means the better electrical conductivity

TABLE 2

| | Tin-containing indium oxide particles | | Coating film | |
|---|---|---|---|---|
| | Shape | Particle size (nm) | Total light transmittance (%) | Surface resistivity (Ω) |
| Ex. 1 | Plate | 30 | 119 | 73 |
| Ex. 2 | Plate | 55 | 108 | 65 |

TABLE 2-continued

| | Tin-containing indium oxide particles | | Coating film | |
|---|---|---|---|---|
| | Shape | Particle size (nm) | Total light transmittance (%) | Surface resistivity (Ω) |
| C. Ex. 1 | Irregular | 50–200 | 82 | 1000< |
| C. Ex. 3 | Spherical to granular | 30 | 100 | 100 |

As can be seen from the results of Table 2, the coating films comprising the plate-form tin-containing indium oxide particles produced in the Examples according to the present invention had better total light transmittance and the lower surface resistivity than the coating film comprising the commercially available spherical to granular tin-containing indium oxide particles of Comparative Example 3. This may be because, since the tin-containing indium oxide particles of the present invention have the plate-form shape, they are arranged with their plate planes in parallel with the surface of the substrate, and as a result, the light can easily pass through the coating film, and the contact resistance decreases since the particles are in contact with each other on their planes.

In the case of the coating film comprising the irregular tin-containing indium oxide particles of Comparative Example 1, the coating film had the transparency to some extent, but the surface resistivity was larger by at least one figure than that of the coating films comprising the tin-containing indium oxide particles of the present invention.

Next, to more clearly show the effects of the plate-form tin-containing indium oxide particles of the present invention when they are used to produce coating films, the transparency and electrical conductivity of the coating films were compared by increasing the filling amount of the particles in the coating film, or by calendering the coating films.

Example 8

Using the plate-form tin-containing indium oxide particles produced in Example 1, the following components of coating liquids were stirred and mixed and then dispersed with a planetary ball mill (manufactured by Friche) for 8 hours to obtain a coating liquid.

The coating liquid was coated on a PET film having a thickness of 50 μm with a bar coater at a dry thickness of 4.2 μm.

| | Parts by weight |
|---|---|
| Tin-containing indium oxide particles | 88 |
| Vinyl chloride-vinyl acetate copolymer | 8 |
| (MR-110 manufacture by Zeon Corporation) | |
| Polyurethane resin | 4 |
| (Vylon UR 8300 manufactured by Toyobo Co., Ltd.) | |
| Methyl ethyl ketone | 75 |
| Toluene | 75 |
| Cyclohexanone | 60 |

With the formed coating film, the total light transmittance and electrical conductivity were evaluated. The total light transmittance was evaluated by measuring a ratio of the intensity of transmitted light to the intensity of incident light (apparatus: UV-visible light spectrophotometer manufactured by NIPPON BUNKO Co., Ltd.), and the electrical conductivity was evaluated by measuring a surface resistivity by the above four probe method (apparatus: LORESTA GP manufactured by MITSUBISHI CHEMICAL Co., Ltd.). The results are shown in Table 3.

Example 9

A coating film was produced in the same manner as in Example 8 except that the plate-form indium oxide particles containing aluminum and tin was used. The thickness of the coating film was 4.6 μm. With this coating film, the total light transmittance and electrical conductivity were measured. The results are shown in Table 3.

Example 10

The coating film produced in Example 8 was calendered at 80° C. under a linear pressure of 50 kg/cm. The thickness of the coating film after calendering was 3.8 μm. With the calendered coating film, the total light transmittance and electrical conductivity were measured. The results are shown in Table 3.

Example 11

A coating film was produced in the same manner as in Example 8 except that the amounts of the tin-containing indium oxide particles, the vinyl chloride-vinyl acetate copolymer and the polyrethane resin were changed from 88 parts, 8 parts and 4 parts to 83 parts, 11 parts and 6 parts, respectively. The thickness of the coating film was 4.0 μm. With the coating film, the total light transmittance and electrical conductivity were measured. The results are shown in Table 3.

Example 12

A coating film was produced in the same manner as in Example 8 except that the amounts of the tin-containing indium oxide particles, the vinyl chloride-vinyl acetate copolymer and the polyrethane resin were changed from 88 parts, 8 parts and 4 parts to 93 parts, 5 parts and 2 parts, respectively. The thickness of the coating film was 4.4 μm. With the coating film, the total light transmittance and electrical conductivity were measured. The results are shown in Table 3.

Example 13

A coating film was produced in the same manner as in Example 8 except that the coating liquid was coated on the substrate so that the dry thickness became 8.1 μm. With the coating film, the total light transmittance and electrical conductivity were measured. The results are shown in Table 3.

Comparative Example 4

A coating film was produced in the same manner as in Example 8 except that the commercially available spherical to granular indium oxide particles of Comparative Example 3 was used. The thickness of the coating film became 4.5 μm. With the coating film, the total light transmittance and electrical conductivity were measured. The results are shown in Table 3.

TABLE 3

| Ex. No. | Shape | Particle size (nm) | Al-substitution amount (mol %) | Content (wt. %) | Thickness (μm) | Total light transmittance (%) | Conductivity (Ω/sq.) |
|---|---|---|---|---|---|---|---|
| 8 | Plate | 30 | 0 | 88 | 4.2 | 94 | 460 |
| 9 | Plate | 50 | 5 | 88 | 4.6 | 91 | 230 |
| 10 | Plate | 30 | 0 | 88 | 3.8 | 96 | 410 |
| 11 | Plate | 30 | 0 | 83 | 4.0 | 96 | 880 |
| 12 | Plate | 30 | 0 | 93 | 4.4 | 91 | 370 |
| 13 | Plate | 30 | 0 | 88 | 8.1 | 90 | 420 |
| C. 4 | Granular | 30 | 0 | 88 | 4.5 | 85 | $2.4 \times 10$ |

As can be seen from the results of Table 3, the coating films comprising the tin-containing indium oxide particles and the indium oxide particles containing aluminum and tin produced in the Examples according to the present invention had the far better total light transmittance and conductivity than the coating film of Comparative Example 4 comprising the commercially available tin-containing indium oxide particles. This may be because, since the tin-containing indium oxide particles of the present invention have the plate-form shape, they are in contact with each other at their plate planes so that the contact area increases and thus the contact resistance decreases. Thereby, the high conductivity may be obtained.

The electrical conductivity of the coating film of Example 9 comprising the indium oxide particles containing aluminum and tin might not be remarkably improved in comparison with the very low volume resistivity of the particles themselves. However, the electrical conductivity of the coating film of Example 9 was still very low by reflecting the good electrical conductivity of the particles themselves.

Furthermore, with regard to the transparency, the coating films according to the present invention had the excellent total light transmittance, since the particles were arranged with their plate planes in parallel with the surface of the substrate, and as a result, the incident light from the direction perpendicular to the plate planes could easily pass through the particles.

As the content of conductive particles in a coating film increases, the electrical conductivity of the film is improved, while the transparency of the film tends to decrease. However, the coating films containing 83 to 95% by weight of the plate-form tin-containing indium oxide particles had the total light transmittance of 90% or more, and the surface resistivity of 1000 Ω/sq. or less.

As the thickness of a coating film increases, the conductivity of the film is improved, while the transparency of the film tends to decrease. However, the coating films comprising the plate-form tin-containing indium oxide particles and having a thickness of 3 to 10 μm had the total light transmittance of 90% or more, and the surface resistivity of 1000 Ω/sq. or less.

The electrically conductive transparent films having the good transparency and the high electrical conductivity at the same time have not been provided, and have firstly produced by using the plate-form tin-containing indium oxide particles, containing 83 to 95% by weight of such particles in the coating film and adjusting the thickness of the film in the range between 3 and 10 μm.

In contrast, in the case of the coating film of Comparative Example 4 comprising the commercially available spherical to granular tin-containing indium oxide particles, since the particle size was as small as 30 μm, the film had relatively good transparency but the inferior electrical conductivity to the coating films according to the present invention.

Effects of the Invention

As explained in the above, the tin-containing indium oxide particles of the present invention are far different from the conventional tin-containing indium oxide particles, and have the plate shape. As a result, coating films comprising such particles of the present invention have remarkably improved transparency and electrical conductivity in comparison with coating films comprising the conventional tin-containing indium oxide particles.

The method for producing tin-containing indium oxide particles according to the present invention is a novel method which is entirely different from the conventional production methods. Thus, the tin-containing indium oxide particles and the indium oxide particles containing aluminum and tin produced by the method of the present invention are plate-form particles and have an average particle size of 10 nm to 200 mm Such particles cannot be produced by the conventional production method.

The tin-containing indium oxide particles of the present invention are suitably used in the formation of electrically conductive transparent films, and break the common knowledge of the conventional coating type electrically conductive transparent films.

The invention claimed is:

1. Tin-containing indium oxide particles, which contain 0.5 to 15% by mole of aluminum, have a plate-form shape and an average particle size in the plane direction of 10 to 200 nm.

2. Tin-containing indium oxide particles according to claim 1, wherein the particle shape is polygonal.

3. Tin-containing indium oxide particles according to claim 1, wherein the particle shape is spherical or elliptical.

4. Tin-containing indium oxide particles according to claim 1, wherein the particle shape is square.

5. An electrically conductive sheet comprising a substrate, and an electrically conductive film, which comprises tin-containing indium oxide particles according to claim 1 and a binder.

6. The electrically conductive sheet according to claim 5, which comprises a plastic substrate and an electrically conductive film having a thickness of 3 to 10 μm formed on said substrate, wherein said film comprises 83 to 95% by weight of tin-containing indium oxide particles which have a plate-form shape and an average particle size in the plane direction of 10 to 200 nm as primary electrically conductive particles in said film, and said sheet has a total light transmittance of at least 90% and a surface resistivity of 1000 Ω/sq. or less.

* * * * *